United States Patent [19]
Hunter et al.

[11] Patent Number: 5,376,471
[45] Date of Patent: Dec. 27, 1994

[54] ALUMINIUM BATTERY WITH ELECTROLYTE CIRCULATION MEANS

[75] Inventors: John A. Hunter, Nr. Banbury, England; Robert P. Hamlen, Bernardsville, N.J.

[73] Assignee: Alcan International Limited, Montreal, Canada

[21] Appl. No.: 989,019

[22] PCT Filed: Sep. 18, 1991

[86] PCT No.: PCT/GB91/01595
§ 371 Date: Apr. 22, 1993
§ 102(e) Date: Apr. 22, 1993

[87] PCT Pub. No.: WO92/05598
PCT Pub. Date: Apr. 2, 1992

[30] Foreign Application Priority Data
Sep. 18, 1990 [GB] United Kingdom ............... 9020344
Feb. 22, 1991 [GB] United Kingdom ............... 9103697

[51] Int. Cl.⁵ .................... H01M 2/38; H01M 12/06
[52] U.S. Cl. ................................. 429/29; 429/27; 429/34; 429/46; 429/51; 429/81
[58] Field of Search .................. 429/27, 34, 29, 51, 429/44, 81, 46

[56] References Cited

U.S. PATENT DOCUMENTS
4,800,009  1/1989  Despic et al. .................. 429/27 X
4,925,744  5/1990  Niksa et al. .

FOREIGN PATENT DOCUMENTS
0263683  4/1988  European Pat. Off. .
0354752  2/1990  European Pat. Off. .

*Primary Examiner*—John S. Maples
*Attorney, Agent, or Firm*—Cooper & Dunham

[57] ABSTRACT

An aluminum cell comprises an electrolysis region with a top reservoir and a sump below. Circulation of electrolyte is by convection. The cell is designed to continue operation past the point at which the electrolyte becomes saturated, and an aluminum hydroxide precipitate settles out by gravity in a stagnant lower region of the sump. The anode is preferably of an aluminum alloy containing magnesium, with tin present in the alloy or in the electrolyte. Batteries comprising stacks of such cells are also described.

14 Claims, 6 Drawing Sheets

ALUMINIUM BATTERY WITH ELECTROLYTE CIRCULATION MEANS

BACKGROUND OF THE INVENTION

This invention relates to aluminium cells, and particularly though not exclusively to aluminium/air cells. These have an air cathode and an aluminium anode, and the net chemical reaction occurring is $$4Al + 6H_2O + 3O_2 \rightarrow 4Al(OH)_3$$

The invention also applies to aluminium cell systems where the oxygen is provided by an oxidising agent such as $MnO_2$ or $H_2O_2$ and to aluminium/silver oxide cells (as in U.S. Pat. No. 3,953,239) in which the overall cell reaction is $$Al + 3/2AgO + 3/2H_2O \rightarrow Al(OH)_3 + 3/2Ag$$

The primary cell system, which may be used with either a neutral chloride or alkaline electrolyte may be recharged mechanically by refuelling the cell with further aluminium. This refuelling takes place in minutes, rather than the hours required to recharge a secondary cell.

Cells with alkaline electrolytes have greatly superior performance to those with neutral chloride electrolytes. The alkaline system provides the basis for both high specific energy (e.g. 400 Wh/kg) and power density (e.g. 175 W/kg), where the comparable figures for neutral chloride systems are 220 Wh/kg and 30 W/kg. Both systems have an infinite shelf life provided that the electrolyte is stored separate from the anode.

A commercially successful aluminium cell employing an alkaline electrolyte has been described in EPA 311275. This cell employs pumped circulation of electrolyte past the anode. The circulation is required for two reasons: to remove aluminium hydroxide from the electrolysis region; and to control the temperature of the electrolyte. However, a pump is disadvantageous for obvious reasons; it requires a secondary power source, and greatly complicates the overall cell system.

EPA 265242 describes a similarly pumped system using injected gas to effect circulation of electrolyte.

U.S. Pat. No. 4,507,367 describes an aluminium-air cell in which hydrogen generated by the anode is used to force circulation of electrolyte. This avoids the need for a secondary power supply. But it requires an anode which generates hydrogen and is therefore inherently inefficient and unsafe. An ideal anode which did not generate hydrogen would not be usable in the system. Also, the entire electrolyte, including the aluminium hydroxide precipitate, is caused to circulate.

U.S. Pat. No. 4,925,744 describes an aluminium-air cell in which electrolyte circulation is by convection. But this is a solids-free high current density cell. When the electrolyte becomes saturated with aluminate, the cell output drops to zero and recharging is required.

The idea of using thermal convection to effect electrolyte circulation in aluminium cells has been canvassed. But there are difficulties:

The neutral saline systems are less efficient (85%), corrode in a non uniform, heavily pitted manner, causing premature anode disintegration and the "product" of reaction is a gel (boehmite) which is not easily removed by the convective forces from the electrode chamber. All in all, they are low power, inefficient and low energy density systems as compared with alkaline cells.

So far as alkaline electrolytes are concerned, cells operated at high current density tend to generate more heat than can be dissipated by simple convection. At low current density, conventional aluminium alloys show low coulombic efficiencies; again, large amounts of hydrogen and heat are generated and the heat cannot satisfactorily be dissipated by simply convection.

There is a need for an aluminium cell in which precipitated aluminium hydroxide settles out by gravity without the need for pumped circulation of electrolyte. This invention aims to provide a semistagnant cell which fulfils that need.

SUMMARY OF THE INVENTION

In one aspect, the invention provides an aluminium cell comprising a cathode and a facing aluminium anode defining between them a vertically extending electrolysis region and a housing to contain electrolyte comprising a sump which has an upper and a lower region and is of a size to contain enough aluminium hydroxide precipitate to permit the cell to continue operating after saturation of the electrolyte has taken place, the lower region of the sump providing a stagnant region where an aluminium hydroxide precipitate can settle by gravity, with provision for convective passage of electrolyte from the upper region of the sump to the electrolysis region and at least one channel for convective passage of electrolyte from the electrolysis region to the upper region of the sump. Preferably, the housing also comprises a top reservoir, with provision for convective passage of electrolyte from an upper region of the sump via the electrolysis region to the top reservoir and at least one channel for convective passage of electrolyte from the top reservoir to the upper region of the sump.

In another aspect, the invention provides a method of operating the cell comprising a cathode and an aluminium anode and an alkaline electrolyte as defined, which method comprises drawing current from the cell at a rate and for a time such that convective circulation of electrolyte takes place between the top reservoir and/or the electrolysis region and the upper region of the sump, and an aluminium hydroxide precipitate settles by gravity in a stagnant lower region of the sump.

In another aspect the invention provides a battery comprising at least one stack, and more usually one or more pairs of stacks, of the cells as defined.

It is generally recognised as impossible to operate aluminium alkaline cells of this kind at high current density for extended periods of time. One reason for this is that the rapid dissolution of aluminium quickly changes the anode-cathode gap. Another reason is that, for a given electrolyte volume, at higher current densities the level of maximum supersaturation increases and in consequence anode passivation is more likely. Such cells can therefore be divided into two groups, those intended to be operated at high current density, and those intended to provide a stable voltage output for an extended period such that supersaturation of the electrolyte does not limit the maximum discharge life. Different cell designs are appropriate for these different applications, whose characteristics will now be summarised.

High current density cells are those which are operated at a current density of at least 400 mA/cm$^2$, and up to 800 or even 1000 mA/cm$^2$ or more. The voltage obtainable is less than would be the case at lower current densities, so the coulombic efficiency is higher and the tendency to generate hydrogen gas is lower. Aluminium dissolved from the anode during discharge builds up in the electrolyte and quickly reaches supersaturated levels; since cells of this kind generally cannot survive the point of maximum supersaturation of the electrolyte, their service life is limited (unless sophisticated electrolyte control means are used).

Cells designed to operate for longer than this are run at lower current densities, typically below 400 mA/cm$^2$, although short bursts at higher current density might be required. Under these conditions, the anode potential is more negative so that coulombic efficiency tends to be lower. Hydrogen gas generation can be a problem, not only because of the explosion hazard, but also because the gas entrains alkaline electrolyte to form a corrosive mist. (This problem can be alleviated by including a surfactant in the electrolyte.) The cells generally need to operate beyond the point at which aluminium hydroxide precipitates out in the electrolyte, and precautions need to be taken to minimise the risk of anode passivation at this time. (The exact nature and state of the precipitate, herein called aluminium hydroxide or hydrargillite, are not material to the invention.) The anode needs to be large, so as to ensure that enough aluminium metal is available to run the cell for the desired extended period.

This invention is mainly concerned with cells designed to operate at lower current densities, herein called high amp hour cells. An important feature of the invention is the use in the anode of an alloy which is able to achieve high coulombic efficiencies at low current densities. Preferably, the anode is of an aluminium alloy containing manganese and/or magnesium and/or calcium with indium and/or tin in the alloy and/or the electrolyte.

Reference is directed to EPA 354752 which describes aluminium cells with alkaline electrolyte based on the Al/Mg/Sn system in the absence of Ga, which are able to achieve coulombic efficiencies above 90% over the whole range of current densities of which these batteries are capable, say 20 mA/cm$^2$ to 1000 mA/cm$^2$. The Sn may be present in the anode or in the electrolyte. In preferred systems, the anode is of an aluminium alloy containing 0.01 to 5% Mg, with Sn present in the alloy at a concentration of 0.005 to 0.2% and/or in the electrolyte at a concentration of 0.001 to 0.01M.

Other suitable though less preferred aluminium alloy/alkaline electrolyte systems are described in EPA 209402 and EPA 358335.

In the preferred operation of cells according to this invention, convective circulation occurs between the top reservoir and the upper region of the sump, with the lower region of the sump remaining stagnant. When alkaline electrolytes are used, it is found that the aluminium hydroxide precipitate migrates to the lower region of the sump and there forms a separate layer, which is initially of a gel-like consistency but subsequently crystallises. The sump must be of a size to contain enough aluminium hydroxide precipitate to permit the cell to continue operating after saturation of the electrolyte has taken place; it is preferably made large enough to accommodate the aluminium hydroxide precipitate formed over the entire life of the cell. The required sump volume is easily calculated from the following facts:

1 g of aluminium (density 2.7) in the anode provides about 3 Amp hours discharge of the cell.

1.2 Amp hours discharge generates 1 cm$^3$ of aluminium hydroxide precipitate in the sump.

If all the aluminium in the anode is used up, then the sump needs to have a volume about 7 times the volume of the anode. In practice, it is only possible to use about 80% of the aluminium in the anode, leaving an anode stub. The volume of the sump should therefore generally be at least 4 times, preferably at least 5 times, the volume of the anode.

When alkaline electrolytes are used, the aluminium hydroxide precipitate settles as noted in the sump. By contrast, when neutral saline electrolytes are used, it is found that the aluminium hydroxide precipitate does not settle, and circulates in a gel-like form which is difficult to remove from the system.

The nature of the cathode is not critical to the invention. Manganese dioxide and silver oxide cathodes are possible, but air cathodes, are preferred. A feature of air cathodes is that they are not wholly impervious to the passage of water as liquid or vapour. For cells designed to have a long active service life, loss of water through the air cathode may be a problem. Indeed in some circumstances it may be loss of water, rather than complete dissolution of the anode or passivation of the anode by aluminium hydroxide precipitate, that causes ultimate cell failure. To minimise this problem, it is preferred to apply a hydrophobic barrier layer to the outer surface of the air cathode. This barrier layer, which may be of microporous PTFE or of a polyolefine, is designed to permit passage of oxygen but not of water.

The cathode faces the aluminium anode and defines a vertically extending electrolysis region. This region is initially narrow, e.g. 1 to 2 mm, but gets wider as the aluminium anode dissolves during operation of the cell (unless arrangements are made to keep the anode-cathode spacing constant). In one preferred embodiment, a cathode is mounted on or in each major vertical wall of the housing with an anode interposed between the two cathodes. To assist circulation of electrolyte from the upper region of the sump to the top reservoir, vertical grooves may be provided in the anode, although these have not been found to be necessary. Preferably, the top reservoir and the sump are contained in the same cell housing respectively just above and just below the electrolysis region.

The top reservoir should be large enough to permit circulation of electrolyte by convection. Beyond that, the top reservoir may need to be large enough to hold surplus electrolyte to allow for water losses (e.g. through an air cathode) during operation of the battery. The housing around the top reservoir may be provided with cooling fins, for control of the temperature of the circulating electrolyte.

Although not preferred, the cell can be operated without a top reservoir, with electrolyte circulating directly between the electrolysis region and the upper region of the sump. A similar effect may arise late in the cell's life if the electrolyte level falls below the bottom of the top reservoir.

At least one channel is provided for convective passage of electrolyte between the top reservoir and/or the electrolysis region and the upper region of the sump. Provision may be made to cool the electrolyte circulating in this channel.

Various factors control the rate at which power can be drawn from the cell. If the current density is too high, then failure may occur from one of several causes:

The electrolyte may overheat or boil. To some extent, this can be compensated by providing a large well cooled top reservoir. Or the anode may extend to the outside of the cell for heat management.

The inter-electrode spacing rises rapidly, due to dissolution of aluminium from the anode, so raising the internal resistance and generating more heat.

Aluminium hydroxide precipitate may be produced so rapidly that it cannot collect in the sump and may passivate the anode. It is possible to mitigate this passivation problem by seeding the electrolyte in known manner (e.g. as described in EPA 354752 and EPA 358335). But seeding the electrolyte is a complication which is preferably avoided. Preferred cells according to the invention do not use seed. Acceptable voltage recovery occurs, without any seed addition, provided that the rate of electrolyte supersaturation with $Al(OH)_4^-$ is below a certain level. This level has not been precisely determined, but has been shown to be greater than 9 Amps (of aluminium) per liter of electrolyte, probably greater than 11 and perhaps about 14 A/l.

Power is preferably drawn from the cells of this invention at a rate of from 5 to 75 $mA/cm^2$. Of course, power can be drawn for short periods at higher current densities. The cell is preferably operated in a high amp hour mode, that is to say until after electrolyte supersaturation with aluminium hydroxide and voltage recovery has occurred. Preferably, such batteries are operated for at least 24 hours. As shown in the examples below, cells according to the invention can be operated at this rate for periods of a week or even longer.

The nature of the electrolyte is not critical. Preferred alkaline electrolytes have a pH of at least 10, preferably at least 12 and may comprise a 10 to 50% solution of NaOH or KOH. The alkaline electrolyte may also contain NaCl, as in the case when the battery is activated by sea water. Preferred electrolytes may be made up from KOH or NaOH dissolved in fresh water or sea water.

In determining the optimum molarity for use in self-managing cells, a number of factors have to be taken into account:

(i) The maximisation of electrolyte capacity (i.e. amp hours/$cm^3$ of electrolyte).
(ii) The avoidance of deep voltage troughs and/or anode passivation.
(iii) The maximisation of average voltage during a discharge.
(iv) The minimisation of electrolyte viscosity.
(v) The operating range of temperature.
(vi) The minimisation of water losses (via transpiration through the cathodes).

Of the items listed, items (i), (ii) and (iii) are the most important; items (iv), (v) and (vi) largely combine to influence (i). It is clear from this list that the final choice of electrolyte molarity is a compromise and may vary between applications. However as the primary requirement of a self-managing cell is the maximisation of energy density, whilst still allowing an acceptable power capability, item (i) is critical. By far the greatest reactant volume component in an $Al-air/O_2$ system is the electrolyte. If a system can be configured to maximise the ability of the electrolyte to accommodate aluminate/hydrargillite (as measured in amp hours/$cm^3$), the volume of electrolyte required will be proportionally reduced and the energy density will be maximised.

If the electrolyte molarity is too low, then cell failure is liable to occur when the electrolyte pH falls below a critical level, as aluminite $Al(OH)_4^-$ accumulates in the electrolyte. When the electrolyte molarity is too high, cell failure is likely to occur when a very high aluminate supersaturation results in the electrolyte conductivity falling (and the viscosity rising) to levels which cannot sustain further discharge. For KOH, electrolyte molarities are preferably in the range 1.5M–7M, particularly 2.5M–5.0M.

Although mean $H_2$ evolution rates from the preferred alloys are very low, in the range $\approx 10$ $mA/cm^2$ to $\geq 1000$ $mA/cm^2$ in alkaline electrolytes, these anodes can generate higher levels of $H_2$ during the start up period. The severity of this corrosion (i.e. duration and level of $H_2$) is believed to be a function of the rate at which metallic tin, Sn· accumulates on the reaction surface. Although this can occur via a continuous release of tin metal from decaying alloy solid solution, a high surface activity of Sn· can be established more rapidly by adding tin to the electrolyte in a soluble form, allowing Sn· to plate onto the reaction surface. Maximising the concentration of tin in the electrolyte minimises the extent and severity of the high $H_2$ period. However, although as much as 0.2 molar concentrations of tin can be dissolved in 2.75M KOH, it has been found that high tin electrolyte levels cause a progressive build-up of Sn· in the form of large dendrites (crystals) on the anode surface. These can bridge the anode-cathode gap, eventually shorting out the cell. In order to avoid this effect, it is preferred that no more than $\approx 0.03$ molar concentrations of dissolved tin be used in "long duration" discharges.

The following reactions describe the sequence of (i), aluminium dissolution, (ii), dissolved aluminate accumulation and (iii), hydrargillite precipitation:

$$Al + 4OH^- \rightarrow Al(OH)_4^- + 3e^- \qquad \text{(i)}$$

$$Al(OH)_4^- \rightleftharpoons AlO_2^- + 2H_2O \qquad \text{(ii)}$$

$$AlO_2^- + 2H_2O \rightarrow Al(OH)_3 + OH^- \qquad \text{(iii)}$$

As aluminium dissolution proceeds, $OH^-$ ions become progressively consumed (via reaction (i)), lowering the molarity and the pH of the electrolyte. Since it is the presence of these ions which provides the electrolyte with its high initial conductivity, the progressive loss of these species, to form $Al(OH)_4^-$, causes a gradual reduction in the conductivity and the cell voltage. In addition, the accumulation of dissolved aluminate, causes a steadily increasing electrolyte viscosity which can further impair cell performance.

The ability of self-managing cells to maintain high voltage output during periods of high aluminate supersaturation, arises from the establishment of significant concentration profiles within the electrolyte i.e. the more dense, aluminate rich (low conductivity) electrolyte, tends to segregate to the lower reservoir leaving relatively aluminate free (higher conductivity) electrolyte in the upper reservoir and, more importantly, the electrode chamber. This does not occur in pumped systems as the dissolved aluminate is always uniformly distributed throughout the electrolyte.

In any high amp hour $Al-air/O_2$ system, (whether pumped or unpumped) utilising a restricted volume of alkaline electrolyte, the critical period in any discharge is invariably the period leading up to the first precipitation event i.e. during the period of maximum aluminate supersaturation of the electrolyte when the conductivity is at its lowest and the viscosity at its highest. Passivation of anodes and/or blocking of reaction cells with rapidly precipitating hydrargillite are common modes of failure in such systems. The maximum level of dissolved aluminate which an electrolyte can accommodate before precipitation occurs is a function of a number of variables. The following tend to increase the level of aluminate supersaturation prior to precipitation thereby increasing the risk of cell/system failure during the "critical period":

(i) Increased molarity of KOH.
(ii) The rate of aluminate ion build-up in the electrolyte (i.e. the current, in "Amps of aluminium" per unit volume of electrolyte).
(iii) Stirring, flowing or agitation of the electrolyte.
(iv) Higher electrolyte temperatures.

The influence of (i) has been discussed above. Item (iv) is less important since although a precipitation of $Al(OH)_3$ is often delayed with increased electrolyte temperature, the conductivity and viscosity of electrolytes improve with increasing temperature, largely compensating for the delay. Items (ii) and (iii) are of particular importance.

The relevance of (ii) is best explained by a consideration of current density (or power) in a given cell of fixed volume/geometry. Essentially, for constant discharge conditions, the greater the current density (power) the greater will be the dissolved aluminate concentration before precipitation occurs. Hence, since aluminate concentration controls conductivity and cell voltage, voltage troughs are deeper with increased power. This ultimately, imparts a maximum power density upon any aluminium power source.

Although this relationship between power and the depth of the first voltage trough applies to both pumped and unpumped systems, item (iii) in the above list very significantly assists systems of the self-managing cell type i.e. for a given power output, a pumped cell, using a given volume of electrolyte will display a more severe voltage trough, later in its discharge, than will an equivalent self-managing cell using the same volume of electrolyte.

Since both the cathode and the anode have limited stability in the presence of the electrolyte, it will normally be preferred to bring them into contact with the electrolyte only when power is required from the cell. Various means are available for storing the electrolyte prior to use. A simple means for storing electrolyte away from the electrodes, while allowing rapid switch-on of the cells, involves the use of a main storage tank sited directly above the cell, or more usually above a stack of cells. At the base of this tank is a single drain hose incorporating a valve (possibly a solenoid activated valve) followed by a series of tubes connecting the valve to the top of each cell in the stack. This storage system allows all of the electrolyte necessary for the operation of the cells to be stored in the tank. The disadvantage of this approach is the total volume of the system is significantly greater than the cell-stack volume.

An alternative involves storing water in the sumps of the cells, and more concentrated alkaline electrolyte than is normally used, in the said tank. This minimises the volume of the tank, thereby increasing the energy density of the system. The water in the sump can, if necessary, be encapsulated in a sealed, aluminised bag, preventing evaporation or contact with the electrodes.

Alternatively, a simple aluminium foil barrier can be sited immediately above the water level, just below the electrode chamber, isolating the sump. During activation, a valve beneath the tank opens, flooding all the cells with concentrated alkaline electrolyte. This immediately activates the cells and consumes, within minutes, any aluminised bag or foil, allowing concentrated alkali and water to mix. This generates an electrolyte of optimum molarity and some heat (heat of mixing) which increases the cell's voltage, shortening the time taken for the system to reach a steady state.

Alternatively again, optimum concentration alkali can be housed in both the sump and the top reservoir of the cell, but kept isolated from the electrolysis region by means of mechanically removable barriers. These can be either flat inert strips positioned in fluid-tight grooves during storage, or hinged panels locked into a closed position by pins which can be removed for activation of the system. Both methods can be carried out automatically or manually. Alternatively again, it is also possible to store water in the sump and concentrated alkali in the cell's top reservoir, thereby obtaining the cell warming effect described in the previous paragraph.

When oxygen cathodes are used, the required oxygen can be provided, either from the air when cells are used in air; or by a supply of oxygen when the cells are used in anaerobic conditions e.g. under water.

It is an essential feature of this invention that an aluminium hydroxide precipitate is removed by gravity from the electrolyte and settles in a stagnant lower region of a sump, generally but not necessarily positioned immediately below the electrolysis region. Gravity settling of the precipitate occurs provided the average particle size is sufficiently large. Particle growth usually occurs by the agglomeration of smaller particles, which agglomeration is hindered or prevented by the pumped electrolyte circulation which is a necessary feature of conventional cells (such as that described in EPA 311275). The absence of a pump should permit gravity settling of precipitate particles.

If necessary, the cell can be artificially cooled, e.g. by the use of fans to pump air across the housing or by a pumped heat-exchange system. But under preferred conditions, the cell can operate without the need for any secondary power source.

Cell Geometry

As previously described, self-managing cells preferably consist of three components; a top reservoir and a sump or lower reservoir with an electrode chamber positioned between. Since it is desirable to minimise the total volume of a self-managing cell (to maximise energy density) it is important to position and proportion these compartments in the most efficient possible arrangement. An ideal arrangement/geometry will, however, vary between applications. This section briefly describes some of the considerations which lead to an optimum cell geometry for any given application.

The first requirement of any cell is to provide a power level adequate for the intended use. For a single cell, operating in a bank, this defines the necessary total current output. And, since the optimum polarisation range for any air-electrode is between 0 and $\approx 100$ mA/cm$^2$, the single cell, maximum power requirement effectively defines the minimum working area for the cathode. In addition, since the coulombic efficiency ($H_2$ evolution rate) of aluminium anodes is optimised by operation at at least 50 mA/cm², it is generally desirable to scale electrodes such that they operate in the range 50 to 100 mA/cm², for as much as the discharge cycle as possible.

Having established an optimum working area for the electrodes, the thickness of the anode plate necessary to meet the endurance requirements is easily calculated:

$$\text{ANODE THICKNESS} = \underbrace{\frac{\overbrace{\text{No. of Amp. hours required}}^{\text{This is defined by the average power and the length of use}}}{\underbrace{8.05}_{\substack{\text{The volumetric capacity} \\ \text{of aluminium} \\ \text{in Amp. hours/cm}^3}} \times \underbrace{\text{(No. of Cells)}}_{\substack{\text{This is normally defined} \\ \text{by a desired system voltage}}} \times \underbrace{\text{Working Area}}_{\substack{\text{Often defined by} \\ \text{an optimum current} \\ \text{density}}}} - \text{"x"}}_{\substack{\text{This is a safety margin} \\ \text{normally 10 to 15\%}}}$$

It should be noted, however, that a further limitation on maximum anode gauge arises from the need to avoid excessive internal resistance within cells. If, after a period of discharge, the gap between anode and cathode exceeds a limiting value (which is defined by the current density), an unacceptable proportion of the stored energy will be released as heat, rendering the system unstable and inefficient. By using the results obtained from self-managing cells and electrolyte conductivity data for typical electrolytes, it has been calculated that the maximum practical anode thickness for a self-managing cell is given by:

$$\text{MAXIMUM ANODE THICKNESS (mm)} = \frac{900}{\text{CURRENT DENSITY (mA/cm}^2\text{)}}$$

(e.g. at 75 mA/cm² the maximum practical anode thickness would be $\approx 12$ mm).

Once the volume of aluminium "fuel" within a cell is defined, it is possible to calculate the minimum lower reservoir volume necessary to accommodate all of the hydrargillite which would be generated by the complete discharge of the anode (as previously described, this is a necessary requirement if the self-managing cell is not to fail prematurely as a consequence of hydrargillite accumulating in the electrode chamber). To do this an amp.hour/cm³ electrolyte capacity value for the lower reservoir is needed. Allowing for variations in the rate of aluminate ion build-up, which affects this value, a figure of 1.1 Amp.hours/cm³ can be assumed in optimally configured cells. The minimum practical lower reservoir volume, to allow complete anode consumption can then be calculated:

$$\text{MINIMUM PRACTICAL LOWER RESERVOIR VOLUME} = \frac{\overbrace{\text{ANODE VOLUME}}^{\substack{\text{The volumetric capacity} \\ \text{of aluminium} \\ \text{Amp. hours/cm}^3}} \times 8.05}{\underbrace{1.1}_{\substack{\text{The typical capacity of} \\ \text{the electrolyte in the} \\ \text{lower reservoir} \\ \text{in Amp. hours/cm}^3}}}$$

As a close approximation this means that the lower reservoir generally needs to be at least 4 times, preferably between 7 and 10 times, the volume of the aluminium anode; the exact figure largely depending upon the current density (lower current densities generally leading to improved electrolyte capacities).

Finally, the volume of the upper reservoir, which, in simple terms, acts as a head of fluid to compensate for water loss (via transpiration through the cathodes) needs to be kept to a minimum if cell energy density is to be maximised. Since the rate of water loss is mainly a function of electrolyte temperature, it is desirable to keep current densities as low as is practicable, if upper reservoir volumes are to be minimised. In cells provided with a fluid return system, which returns water escaping through the cathodes to the upper reservoir, directly improves the cell energy density because it reduces the need for a large volume upper reservoir.

BRIEF DESCRIPTION OF THE DRAWINGS

Reference is directed to the accompanying drawings in which.

DETAILED DESCRIPTION OF THE PREFERRED EMBODIMENTS

Figure 1:
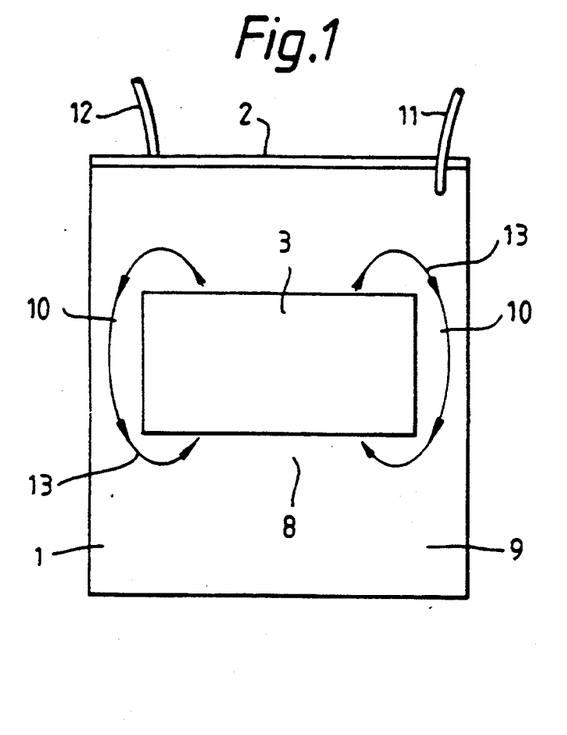
FIG. 1 is a front elevation of a cell according to the invention.

In FIG. 1, the cell comprises a housing 1 of metal to contain electrolyte and an insulating lid 2. Air cathodes 3 are mounted across windows in the major vertical faces of the housing. An aluminium anode 4 is positioned between the two cathodes and defines with them two vertically extending electrolysis regions 5. The housing defines a top reservoir 6 and a sump 7 having upper and lower regions 8 and 9 respectively. The top reservoir is connected to the sump by means of channels 10 adjacent the ends of the anode. The cathode and anode are provided with electrical connections at 11 and 12 respectively.

In use, the reservoirs are filled with alkaline electrolyte and current is withdrawn from the cell, preferably at a rate of 5 to 75 mA/cm². Heat generated in the electrolysis region causes gentle circulation of electrolyte in the manner shown by the arrows 13 in FIG. 1, mainly by heat convection but perhaps also by gravity/density profile. The top reservoir heats up providing a temperature and aluminium hydroxide concentration gradient within the electrolyte. The lower region of the sump remains essentially stagnant during discharge; an alumina based gel forms in this region in the early stages of discharge and subsequently changes to a crystalline precipitate.

Figure 3:
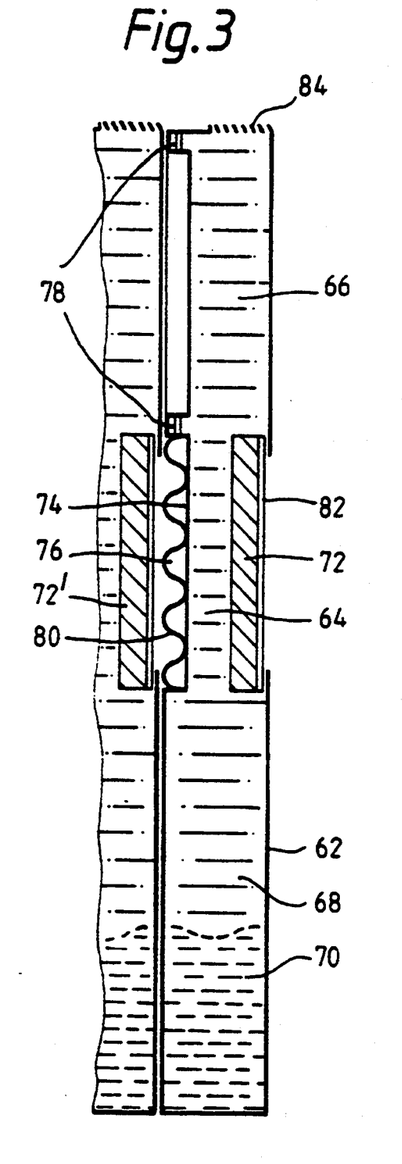
FIG. 3 is a sectional side elevation of a different design of cell.

FIG. 3 shows a sectional side elevation of another design of cell. An electrically insulating housing 62 defines an electrolysis zone 64, a top reservoir 66 and a sump comprising an upper region 68 and a stagnant lower region 70 all filled with electrolyte. The two major vertical walls of the housing have facing apertures. Across one is sealed an aluminium plate 72 of thickness from 0.25 to 1 cm, which serves as the fuel for the cell. Across the other aperture is sealed an air cathode 74, with one surface in contact with the electrolyte in the electrolysis region and the other surface in contact with air or oxygen. The gas side of the air cathode is made electrically conductive. Gas flow ports 78 supply air or oxygen to a region 76 on the gas side of the cathode. A porous conductive separator 80 is positioned in the gas space 76, and provides electrical connection between the oxygen cathode 74 and the aluminium anode 72 of the next adjacent cell. A layer of a protective conductive non-reactive material such as nickel, is provided at 82 on one surface of the aluminium anode, and serves as a barrier to eliminate electrochemical contact between the conductive screen 74 and the back of the anode.

This system has the advantage of simplified electrical connections. There is reduced voltage loss in larger sized cathodes, since electrical current flows are straight through rather than via electrical connectors positioned at one corner. For terrestrial operation, it will generally be convenient to cause a supply of air to flow into and through the region 76. For operation using oxygen, e.g. under water, the cathode region 76 can be essentially a dead-end chamber into which oxygen is admitted at the rate at which it is to be consumed, only a small bleed being required to allow for the escape of any nitrogen impurities present in the oxygen.

For underwater operation, it is preferred to fill the top reservoir 66 completely with electrolyte to minimise the possibility of generating a mixture of hydrogen and oxygen gas. Gas can be expelled from the top of each cell through a hydrophobic filter 84 or by means of a pressure relief valve. The system is preferably operated in a pressure-balanced mode, with the electrolyte pressure maintained higher than the ambient oxygen pressure by means of a common electrolyte feed system (not shown). The oxygen pressure in turn is higher than the ambient pressure, but lower than the electrolyte pressure. These features minimise the direct flow of oxygen from the gas side of the cathode into the electrolyte.

Figure 4:
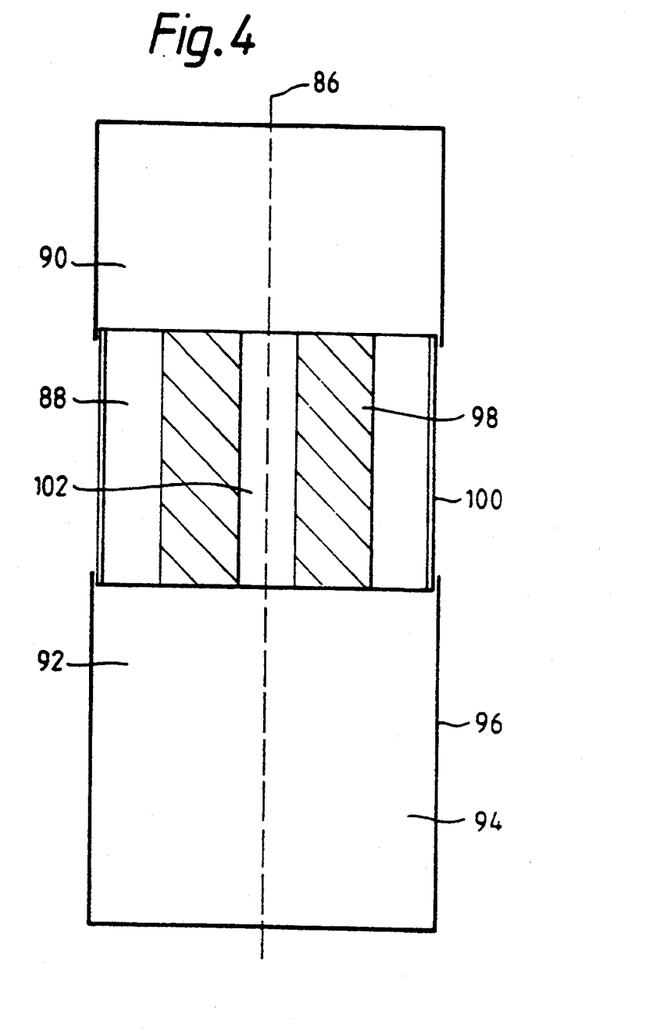
FIG. 4 is a sectional side elevation of yet another design of cell.

FIG. 4 is a sectional side elevation of another design of cell, this one being cylindrical about an axis of symmetry shown as 86. The cell comprises an electrolysis region 88, a top reservoir 90, and a sump comprising an upper region 92 and a stagnant lower region 94, all contained within a housing 96. A tubular anode 98 is surrounded by an air cathode 100 which is sealed across an aperture extending round the circumference of the housing. During operation of the cell, convective circulation of electrolyte takes place upwards in the electrolysis region 88 and downwards in an axial region 102 within the anode.

This design maximises coulombic efficiency, even at lower power output where parallel plate cells start to generate increasing levels of hydrogen. This is because the working area of the anode is always smaller than that of the cathode. This means that at any cell current the anode current density is always relatively high while the cathode current density is relatively low. This is particularly desirable for low power operation, since at current densities below about 50 mA/cm$^2$, all aluminium anodes generate increasing levels of hydrogen. Conversely, cathodes generally maintain best voltage characteristics at current densities are as low as possible. This arrangement therefore allows the two electrodes to operate under optimum conditions in a way which is impossible in a parallel plate arrangement. Cells of this type can also be made hexagonal in order to improve the packing density of the stack.

Figure 5:
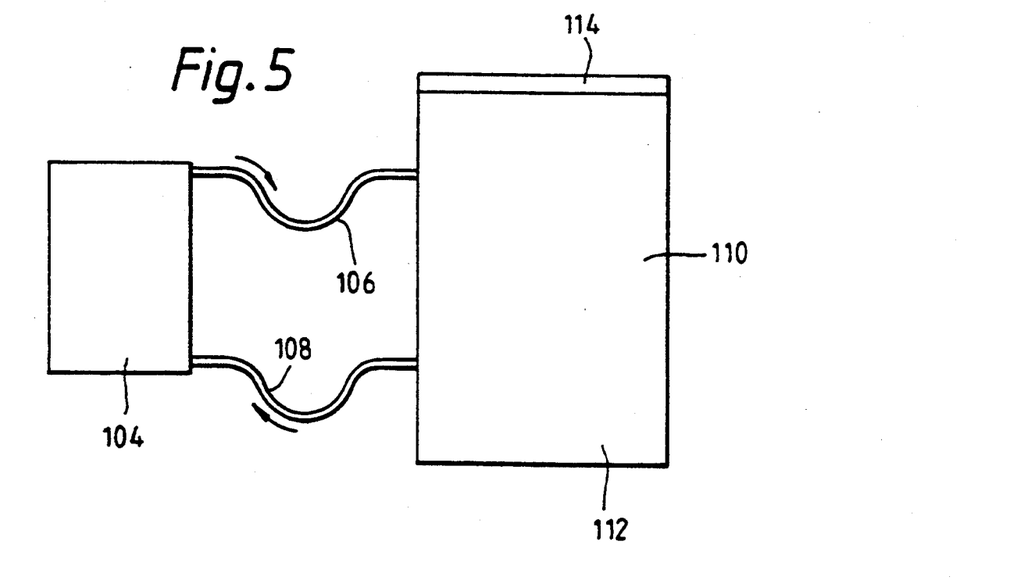
FIG. 5 is a diagram of a modified electrolyte circulation system.

In the designs shown in FIGS. 1 to 4, the top reservoir has been situated immediately above, and the sump immediately below, the electrolysis region. As shown diagrammatically in FIG. 5, this need not necessarily be the case. Referring to FIG. 5, the numeral 104 shows an anode and cathode system defining between them an electrolysis region, which is connected at its upper and lower ends by pipes 106 and 108 respectively to a container 110. The pipes can be made flexible, or the relative heights of regions 104 and 110 can be varied in some other way.

Initially, the container 110 is full of electrolyte and the electrolysis region of 104 is empty. Region 104 is lowered, so as to become filled with electrolyte by gravity, and the battery starts to operate. Heat generated by electrolysis causes convection, which drives electrolyte to and from the container 110 along the pipes in the directions marked by arrows. An aluminium hydroxide precipitate settles in a stagnant lower region 112 of the container. Any gas evolved during electrolysis is collected at the top 114 of the container. Power generation can be stopped at any time by raising the region 104 so as to empty it of electrolyte.

The system described has various advantages. Several cells 104 connected in series can all be joined (by separate pipes 106, 108) to a single container 110. That container may contain baffles, to reduce shunt currents between adjacent cells, and to prevent reentrainment of aluminium hydroxide precipitate if the system is accidentally shaken. Solenoids or rupture diaphragms may be provided in the pipes 106, 108 to control electrolyte flow. Hydrogen gas, if desired, and solid precipitate can be collected in a single container from several separate cells. Heat management of the system can be performed by cooling means acting either on the pipes or on the container 110.

A battery is a stack of these cells formed by abutting faces of adjacent housings together. The faces may be sealed to one another in a confronting fluid-type manner with provision therebetween for supply of oxygen to the oxygen cathodes.

One use to which these batteries are being put is as a power source in undersea vehicles. In such use, the batteries are either contained in a dry pressure hull or are immersed in sea water. In the absence of ambient air a source of oxygen is required. When the undersea vehicle is of circular cross section, the stacks of cells comprising the battery are preferably also of generally circular cross-section.

The following paragraphs describe preferred features of such batteries and comprises four aspects.

1. In a first aspect, the battery comprises a pair of stacks of metal/oxygen cells each having an electrically non-conducting housing comprising opposed faces and a rim region, wherein the rim region is generally D-shaped including a vertically extending generally straight portion, with each stack being formed by abutting faces of adjacent housings together, and the pair of stacks being formed by abutting together the vertically extending generally straight portions of the rims of the cells of the two stacks.

Preferably each cell, and correspondingly each stack of cells, is semi-circular in cross section with a rim including a preferably straight vertical portion and the remainder of the rim being generally semi-circular. Two such stacks of cells, one shaped like a letter D facing forwards and the other shaped like a letter D facing backwards, are abutted together to form a battery having a generally circular cross-section. It may be convenient for the housings of two cells whose rims abut to be made integral with one another.

The concept is thus seen to involve taking a stack of cells of generally circular cross-section and splitting each cell into two parallel cells forming two parallel cell stacks. In this way if one of the two parallel cells or stacks develops a fault during discharge, then only that half cell or stack needs to be taken out of circuit. In this way it is possible to significantly increase system reliability without loss of supply voltage.

Figure 6:
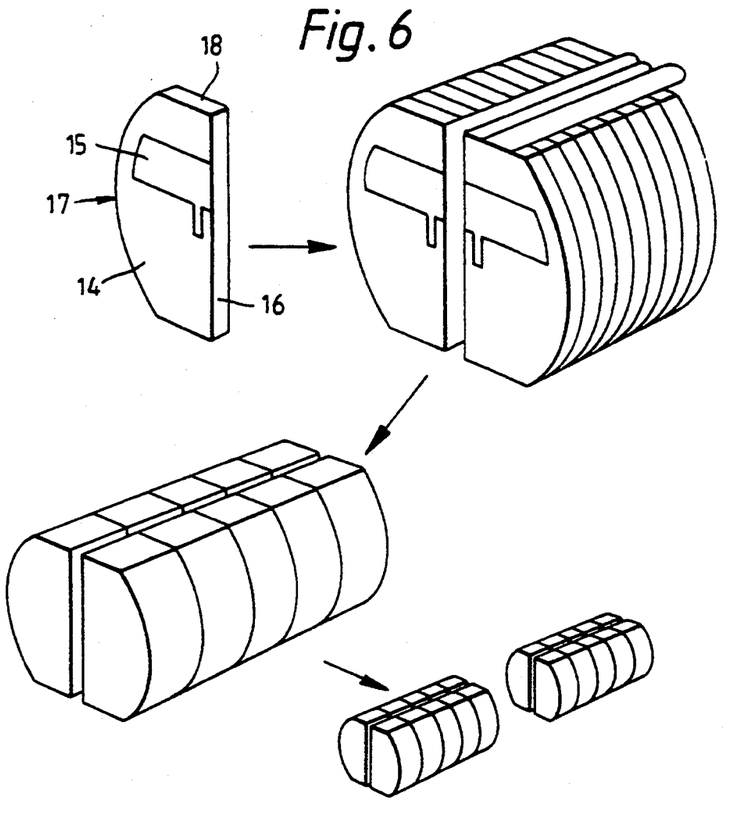
FIG. 6 is a diagram containing four perspective views of cells and stacks of cells.

Reference is directed to FIG. 6 of the accompanying drawings which contains four perspective views of cells and stacks of cells. A cell comprises an electrically non-conducting housing having opposed faces 14 each of which carries a sheet-like oxygen cathode 15 sealed to a window in the face. The housing includes a generally D shaped rim region including a vertically extending generally straight portion 16 and a generally semi-circular portion 17. Top and bottom portions 18 of the rim are made flat to provide room for connection to the electrode and cable conduits inside a cylindrical hull.

The second diagram shows a pair of assemblies (or stacks) each of nine cells, the pair formed by abutting together the vertical portions of the rims of the cells. The third diagram shows a pair of 45-cell half stacks comprising five such assemblies. The fourth diagram shows a battery of 180 cells in two pairs of 45-cell half stacks.

2. In a second aspect the battery comprises a plurality of metal/oxygen cells, or stacks of cells, arranged electrically in series with an electrical circuit for drawing current from the battery, wherein there are provided means for switching one or more cells or stacks of cells out of the circuit. This feature may be needed to reduce the spread of voltage range from the start to the end of discharge.

This aspect can be illustrated by reference to the fourth diagram of FIG. 6, showing a battery comprising 180 D-shaped cells arranged in two pairs of half stacks each containing 45 cells. It is desired that the voltage remain within acceptable limits, for example 116–140 V. If high power (15 kW) is taken from the battery, then the voltage remains within the desired limits. At lower power levels (0.5 kW and 2 kW), the maximum acceptable voltage may be exceeded during the early stages of discharge. This can be controlled by switching out a complete cell stack module of 18 D-shaped cells, which reduces the stack voltage by the required amount. The module can then be switched back in at a later stage of discharge. The switching means can be made automatically responsive to the voltage generated by the battery, or can be manually operated.

3. It is of critical importance in the operation of a power source on a vehicle, particularly one for sub-sea use, that any change in centre of gravity during discharge is minimised such that it is within the capability of the vehicles control system to trim out any such change.

In a third aspect, the battery comprises an even number of stacks of metal/oxygen cells and an oxygen supply, wherein the stacks of cells are arranged in one or more pairs symmetrically on opposite sides of the oxygen supply, and means are provided for passing oxygen from the supply to the or each pair of stacks of cells.

Figure 7:
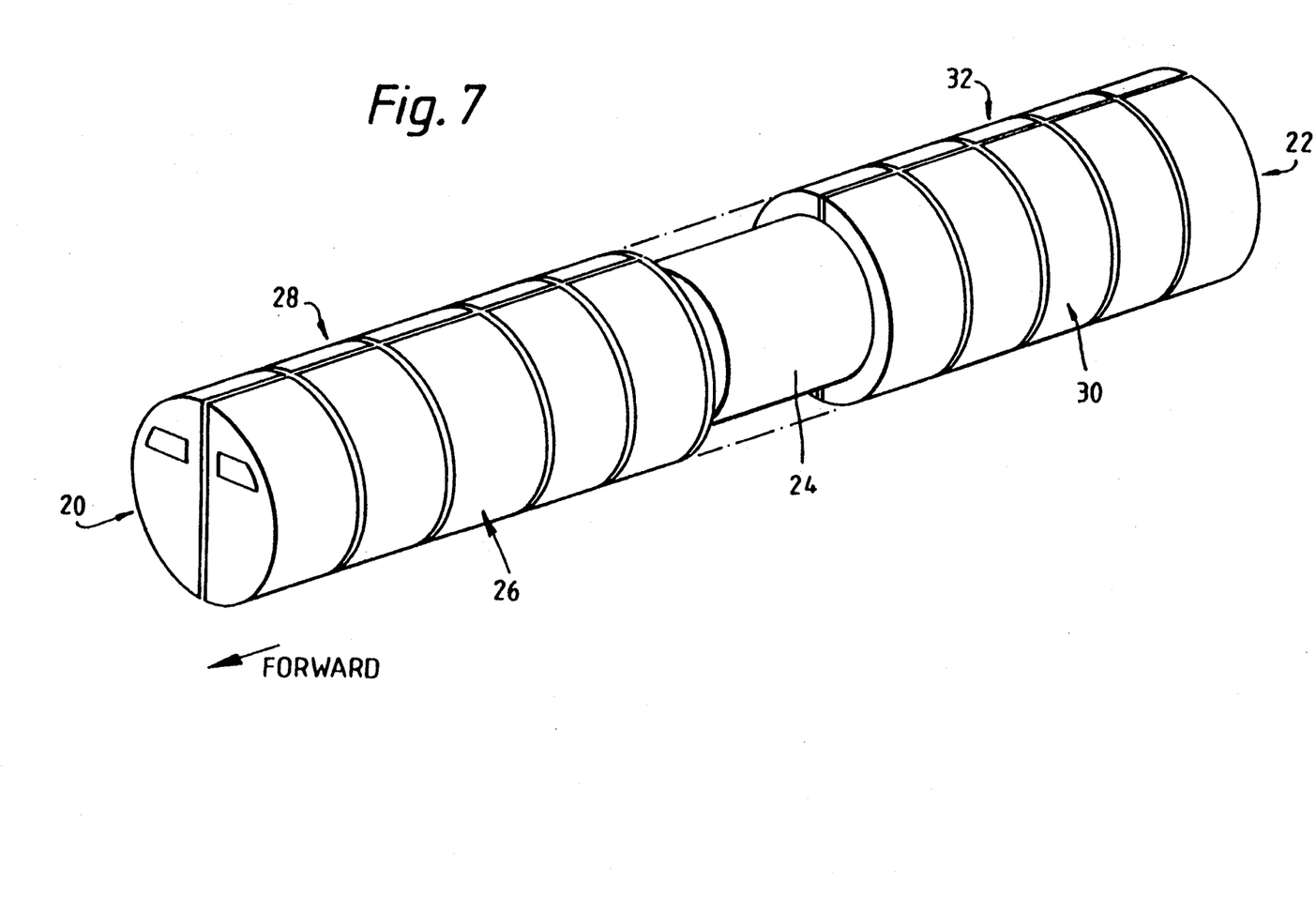
FIG. 7 is a perspective view of a battery of 180 cells corresponding to the fourth diagram of FIG. 6.

Reference is directed to FIG. 7 of the accompanying drawings, which is a perspective view of a battery of 180 cells corresponding to the fourth diagram of FIG. 6. The cells are D-shaped in cross-section and are arranged in two pairs of stacks 20, 22 on opposite sides of an oxygen supply 24, the whole battery having a generally circular cross-section. The forward pair of stacks 20 comprises a left side stack 26 and a right side stack 28, each stack being formed of five assemblies each of 9 D-shaped cells (see FIG. 6). Similarly, the rear pair of stacks 22 comprises a left side stack 30 and a right side stack 32.

In use, the forward right hand stack 28 is electrically connected in series to the rear left hand stack 30; and the forward left side stack 26 is connected in series to the rear right hand stack 32. During discharge, oxygen from the central storage container is transferred to the cell stacks resulting in a weight increase in the cell stacks. If a cell stack pair is shut down due to a serious failure, then a sub-sea vehicle can still operate on the remaining pair and still maintain trim as mass changes occur.

4. An Al/oxygen power source produces typically as much heat as electricity. This heat must be transferred from the power source such that the optimum cell operating temperature is maintained irrespective of power output.

In a fourth aspect, the battery comprises a stack of metal/oxygen cells, wherein there is provided an evaporating heat exchanger having a hot section within the housing to be in contact with the electrolyte and communicating with a cold section outside the housing. The heat exchanger may be a closed system containing a volatile liquid such as ammonia, with the hot section immersed in electrolyte in a top reservoir of the cell and the cold section in thermal contact with a hull of a sub-sea vehicle or directly with sea water.

Figure 8:
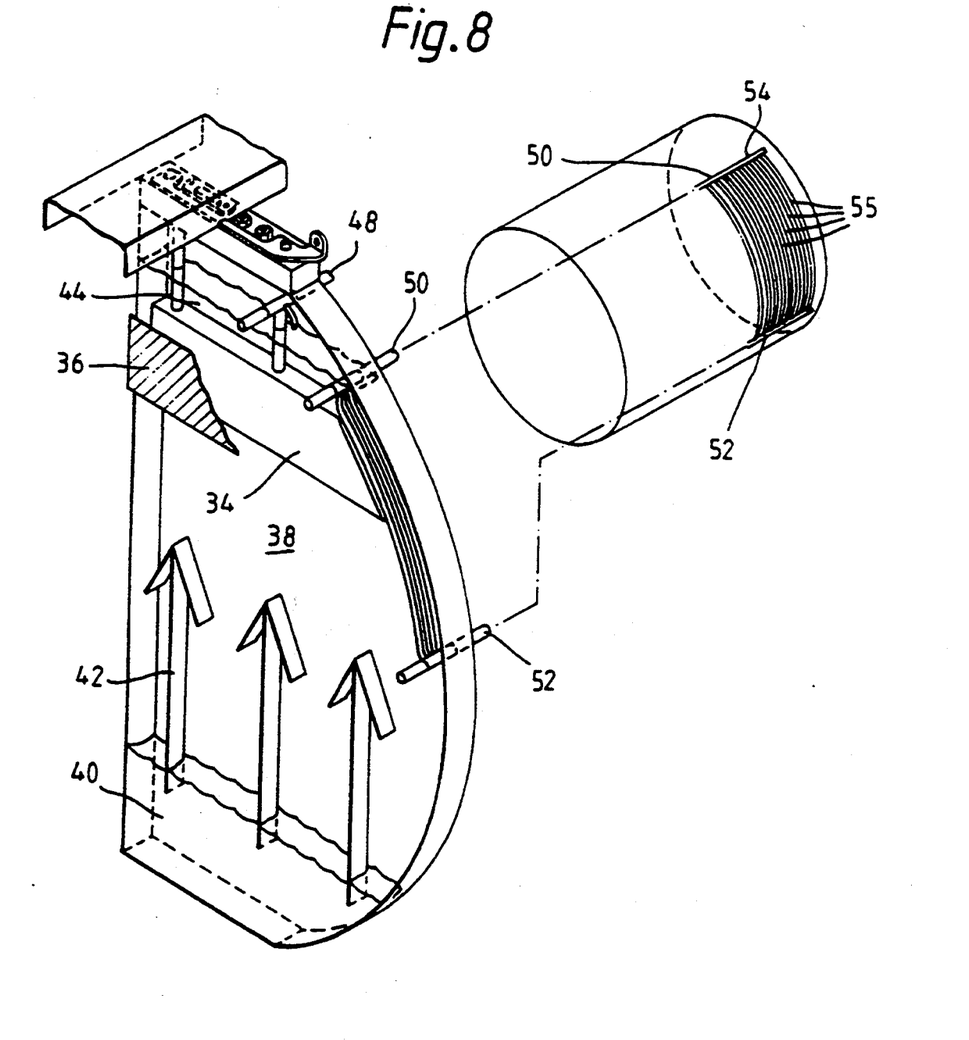
FIG. 8 is a perspective diagram partly cut away of a cell forming part of a stack of circular cross section.

Reference is directed to FIG. 8 of the accompanying drawings, which is a perspective diagram partly cut away of a cell forming part of a stack of circular cross section. The cell comprises an aluminium anode 34 and two facing oxygen cathodes 36 (one shown partly cut away). A sump 38 contains electrolyte with an aluminium hydroxide precipitate concentrated in a stagnant lower region 40, baffles 42 being provided to contain the precipitate. In use, electrolyte circulates between the sump and a top reservoir 44. Provision is made for hydrogen ducting at 46 and for an oxygen supply at 48 to the oxygen cathode.

Two cooling manifolds of a heat exchanger system are provided immersed in the electrolyte, 50 in the top reservoir and 52 in the sump. These are connected to condenser heat exchanger tubing 54 bonded to the hull of the sub-sea vehicle and in contact with sea water. Flow through the heat exchanger system may be achieved directly by thermosyphonic action or may require a coolant pump. This allows thermostatic control through on/off or flow-rate control of the pump.

Figure 9:
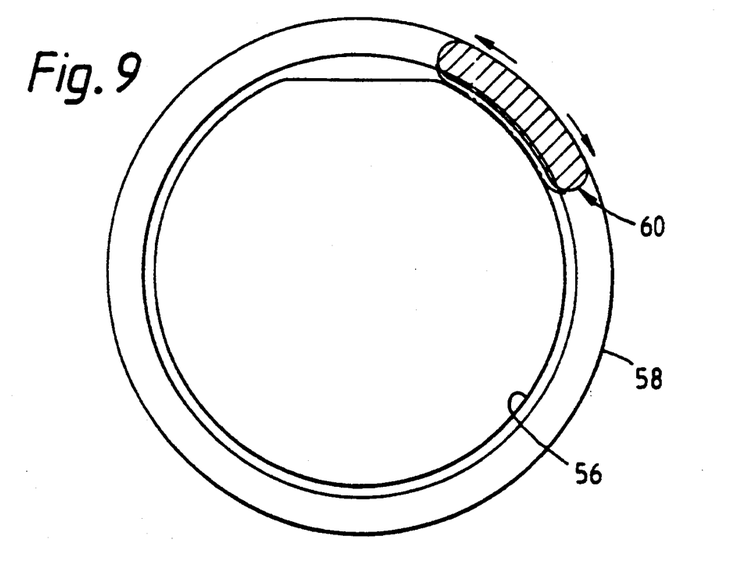
FIG. 9 is a diagrammatic front view of a metal/oxygen cell and shows an alternative heat exchanger system.

Reference is directed to FIG. 9 of the accompanying drawings which is a diagrammatic front view of a metal/oxygen cell and shows an alternative heat exchanger system. The housing of the cell comprises a double rim, including an inner rim 56 to with the hull of a sub-sea vehicle or direct with sea water, the two rims being separated by an annular space. Within that space is a closed flexible container 60 containing a volatile liquid. At ambient temperature, the bag overlies a portion of the inner rim adjacent the top reservoir (not shown). When the cell is in operation, the bag is inflated by evaporation of the liquid and presses against the outer rim, which facilitates transfer of heat from the cell to its surroundings.

Figure 10:
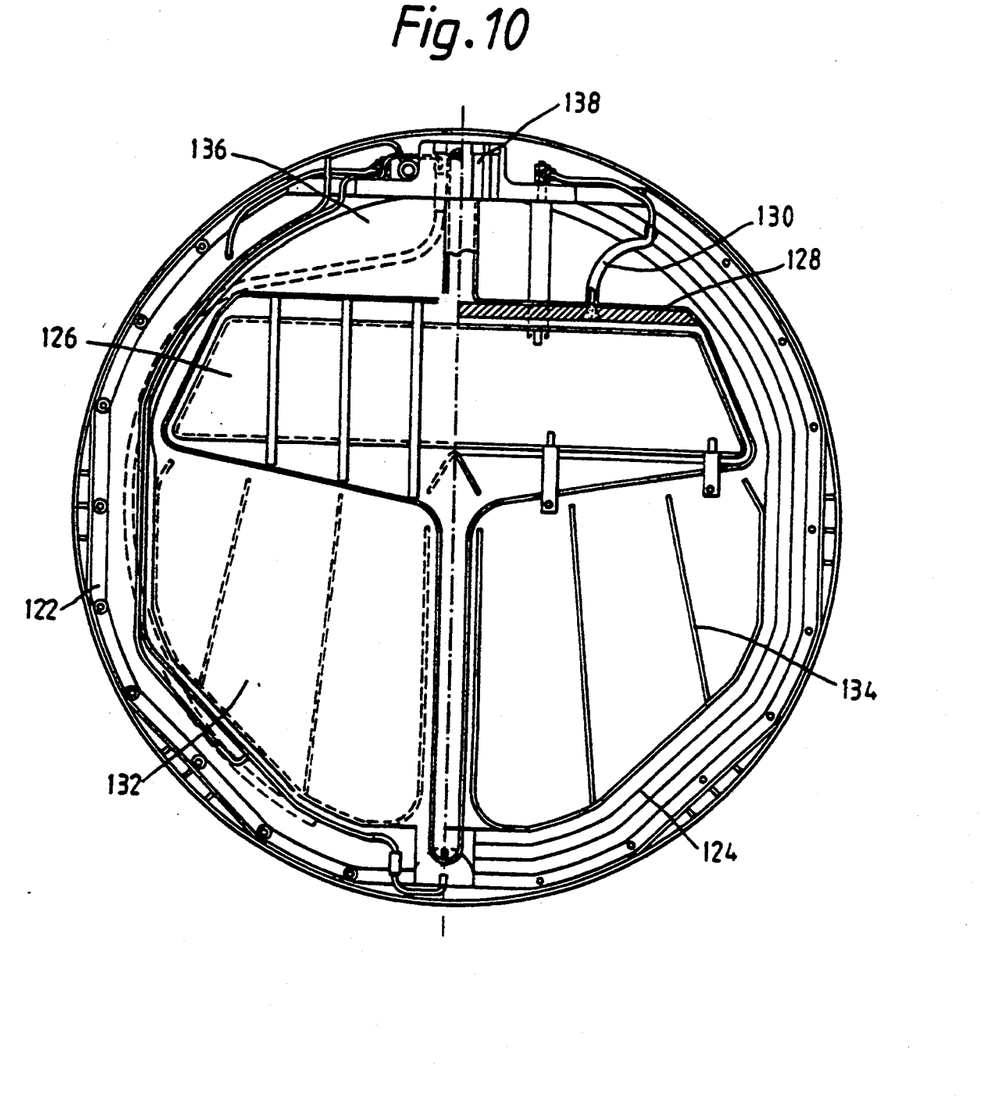
FIG. 10 is a diagrammatic front view of a circular thin walled cell.

FIG. 10 is a part-sectional front elevation of the cell used in Example 6 below. The cell is constructed of two 50 cm diameter fiberglass shells 122 with edges stepped at 124 to permit individual cells to stack together. A trapezoidal anode 126 has a surface area of 600 cm$^2$. Facing O$_2$ cathodes 128 are mounted in windows in each major face of the shell. Each cathode has an oxygen supply 130. A sump 132 includes baffles 134 to help settle the hydrargillite precipitate. A top reservoir 136 contains a hydrogen vent 138.

The cells can easily be designed in modular form, adapted for stacks of cells to be connected together in series as a battery to generate any desired power output. To get a given power output, it is possible to use: either a large current and a small voltage, i.e. a few large cells in series; or a small current and a large voltage, i.e. many small cells in series. The latter may be preferred, since large currents may generate large heat losses and require large and often expensive electrical connections. The sizes of cells according to this invention can vary within wide limits. Very small cells become uneconomic because the weight of the housing increases relative to the volume of the electrolyte. With very large cells, it may become progressively more difficult to dissipate heat merely by convective circulation. In the absence of shunt currents, there is really no upper limit on the number of cell modules that can be connected together in series to provide a desired battery power output. A stack of such cells can conveniently be filled with electrolyte from a storage tank via a manifold pipe with entry apertures through the lid of each housing. The following advantages are possible for cells according to the present invention in comparison with pumped systems such as that described in EPA 311275.

a. Apart from an activation mechanism to feed electrolyte to the electrode chamber at the start of the discharge, and possibly a fan to supply air to a stuffer box (a box round the cell stack into which air or O$_2$ is pumped to keep constant O$_2$ concentration at all cells) there need be no moving parts.
b. Battery stacks have no shunt currents making units more efficient and more predictable (easier to model).
c. Because of zero shunt currents, high voltage relatively low current stacks can be built making electrical connections and heat management simpler.
d. No seeding agent/system is necessary for power densities up to at least 14 W/lit. The limit with pumped system is less than 6 W/lit and seeding is required.
e. Because the energy density of individual cells is very high ($\geq$700 W.Hrs/lit) and cells can be made virtually any size, the range of products which are feasible is much greater than with pumped units.
f. Because there is no forced flow of electrolyte, the tendency to hyperactivate the anodes (high H$_2$ during early discharge) is greatly reduced. (See EPA 326338).
g. Manufacturing costs will be substantially lower for these batteries than for pumped systems. Modifications to existing products should also be easier (just add or subtract cells).
h. Because of the inherent modularity of the system plus its greater energy and power density, sequential discharge of "small" separately activated modules is made easier. Thus a switch-on/switch-off facility is made possible after partial discharge, even after extended "off" periods.
i. In cases of anode contamination, only the individual cells afflicted with "bad" anodes will suffer higher H$_2$ levels. In any common manifold, pumped system "cross-contamination" of cells is inevitable.
j. Bi-polar arrangements with AgO, MnO$_2$ or even air is made more practicable since there are no shunt currents.
k. Cells can be made in a wide variety of shapes (e.g. circular) such that stacks can be more easily made con-formal with the available space.

Figure 2:
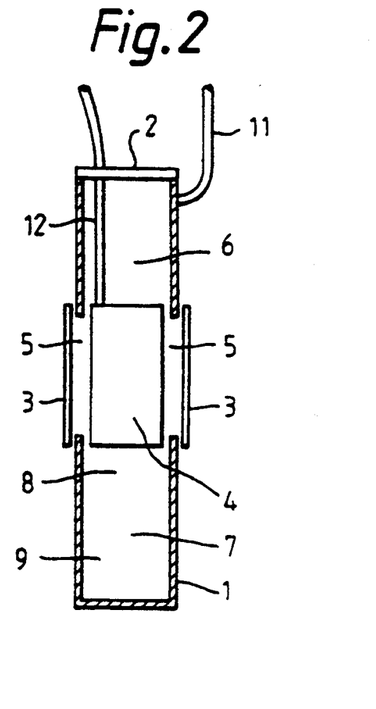
FIG. 2 is a sectional side elevation of the cell.

The following examples illustrate the invention. In Examples 1 to 3, the cell used was generally as illustrated in FIGS. 1 and 2 of the drawings. The complete cell was about 2.5 liters in volume and accommodated about 1.9 liters of 5M KOH electrolyte. Two types of anode were tested; a simple flat plate anode with a screw in current collector tab, and an anode with vertical grooves machined into both faces to encourage electrolyte flow.

In all the examples, the alloy was a standard extruded (12 mm gauge) Al+0.5% Mg+0.07% Sn material. Air cathodes were used in all experiments.

Examples 4 to 6 describe the construction and performance of various different designs of self-managing cell. Example 7 describes the performance of a stack of the cells used in Example 6.

EXAMPLE 1

A simple flat plate anode was used with about 1.9 liters of 5M KOH+0.004M SnCl$_2$ (initially at ambient temperature). The cell ran for 69 hours at a constant 14 Amps (36 mA/cm$^2$). The mean cell voltage was about 1.35 V. The minimum voltage at the point of maximum Al(OH)$_4$$^-$ supersaturation was about 1.17 V. During operation the top reservoir warmed up from ambient to about 40° C., while the bottom reservoir stabilised at about 33° C. At the end of the experiment the anode was found to be flat and smooth exhibiting about 93% efficiency. There was enough metal left for about 30 hours further discharge. It is believed that failure was caused by the build up of solids in the anode/cathode gaps.

EXAMPLE 2

In this experiment the anode was provided with vertical grooves. Water losses were reduced by fixing a pair of hydrophobic membranes over the air cathodes. The intention was to cause the air in the gap between the two membranes to saturate with water vapour thereby reducing water losses.

The cell ran for about 72 hours at 14 Amps under conditions as described in Example 1. The depth of the voltage trough during electrolyte supersaturation was significantly reduced, the minimum voltage being about 1.29 V. This is believed to have been a consequence of the much reduced water losses during discharge. At the end of the test, the anode was flat and smooth exhibiting about 94% efficiency.

EXAMPLE 3

In this experiment the same cathodes, and electrolyte and anode of the same composition, were used as in the previous two experiments. Discharge was effected at a constant 7 Amps (18 mA/cm$^2$). There was no significant voltage drop at electrolyte supersaturation. The temperature of the top reservoir stabilised at 35° to 40° C., while the temperature of the sump remained at around 30° C. The battery ran for more than a 150 hours before failure.

Based on these experiments, the following figures are postulated for a stack of 36 such cells operating at 14 Amps (about 19 Watts per cell):

Volume of each cell—2.5 liters (this includes a 0.5 liter top reservoir and 1.5 liter sump).

Total volume—160 liters (90 liters for the cells+70 liters for a main electrolyte storage reservoir).

Total power—680 W.

Probable maximum discharge period—100 hours.

Energy density—425 Watt hours/liter.

Power density—4.25 Watts/liter.

EXAMPLE 4

The cell used for this experiment was a 60 cm tall 25 cm wide 1.8 cm internally thick lucite box with cathode windows positioned half way up the side walls. A 16.5 cm×11 cm×1.2 cm anode (total working area 360 cm$^2$) was suspended between two cathode windows from the cell top by a single rod current collector. The cathode windows were 18 cm×12 cm, slightly larger than the anode faces. The two cathodes were bonded on to the inner faces of the cell side walls in order to minimize anode cathode gaps, which at the start of the experiment were about 3 mm. The two cathodes were connected together electrically, effectively forming one "wrap around" cathode.

The electrolyte was 4M KOH containing 0.01M dissolved Sn. The cell was discharged at 7 Amps constant current for 150 hours.

At the start of the discharge, the 23° C., 4M KOH electrolyte had a specific conductivity of ≈500 milli Siemens/cm and a viscosity (relative to water) of ≈1.75. During the initial 8 hours of discharge, the electrolyte conductivity increased to ≈550 mS/cm in the upper reservoir (slightly less in the lower reservoir) and the viscosity fell by a small amount. Both these changes were a consequence of the warming of the electrolyte. Once a relatively stable temperature had been established, the major influence upon conductivity and viscosity was the progressive build up of dissolved aluminate, Al(OH)$_4^-$, in the electrolyte. And, since the electrolyte conductivity largely controlled the cell voltage, it is useful to consider the sequence of chemical reactions which occur in these electrolytes during high amp hour discharge.

A progressive reduction in the efficacy of the electrolyte continued until the point of maximum supersaturation with dissolved aluminate was reached after ≈65 hours (the conductivity, at this stage, was typically as low as 200 mS/cm and the viscosity around 2.0). At this point, reaction (iii), precipitation of hydrargillite began. This coincided with the electrolyte turning milky white and the appearance of a thin layer of hydrargillite particles in the base of the cell. During this precipitation period, between ≈65 and 80 hours, the level of dissolved aluminate fell to a level just above the equilibrium solubility level. This released OH$^-$ ions which had been "tied-up" as dissolved aluminate (see the products of reactions (iii)). This increased electrolyte conductivity and reduced viscosity (due to the lower level of dissolved Al(OH)$_4^-$). The effects directly resulted in a first "voltage-recovery". Since reaction (iii) is exothermic, the temperature increase in both the upper and lower reservoirs which accompanied this voltage recovery was a consequence of the progressive precipitation of hydrargillite.

After ≈80 hours the voltage and temperature started to fall once more and the electrolyte partially cleared revealing a band of compacted hydrargillite in the base of the cell. Between ≈80 and 95 hours there appeared to be no further generation of solids. This period was essentially a repeat of the progressive supersaturation of the electrolyte which occurred during the first 60 hours of discharge. At around 95 hours a second voltage recovery commenced and was again accompanied by the electrolyte turning milky. This was the restart of hydrargillite precipitation. In all, this cycle of electrolyte supersaturation with Al(OH)$_4^-$) and precipitation of Al(OH)$_3$ was repeated four times in this experiment, before the level of hydrargillite exceeded the volume of the lower reservoir and began to "choke" the electrode chamber.

The cyclical relationship between electrolyte chemistry, conductivity and viscosity, and the cell voltage and temperature observed in this experiment is typical of the behaviour of all self-managing cells. It is worth noting that despite the occurrence of a significant increase in viscosity and a reduction in measured electrolyte conductivity to around one third of its original level on four occasions during this discharge, the output of this cell remained very stable throughout the 150 hour experiment. In contrast, it has not proved possible to maintain acceptable voltage output from pumped/circulating electrolyte systems when the electrolyte conductivity/viscosity has fallen to 200 mS/cm. Hence, for pumped systems, it is necessary to incorporate complex precipitation/crystallizer devices to prevent the electrolyte becoming too heavily supersaturated with dissolved aluminate.

EXAMPLE 5

The cell used for this experiment was essentially a taller (92 cm) version of that described in Example 4, with cathode windows 30 cm below the top. The capacity of the lower electrolyte reservoir (sump) was adjusted for different experiments by inserting close fitting blocks, effectively raising or lowering the cell's base. Several experiments were performed using this cell, and the results are set out in the following table. In all experiments, the electrolyte was based on KOH (at stated concentration) containing 0.008M dissolved Sn.

| Test | Cell load (Watts) | Discharge Time (hours) | Electrolyte KOH (M) | Coulombic Efficiency (%) |
|------|-------------------|------------------------|---------------------|--------------------------|
| A    | 25                | 69.25                  | 4                   | 99.5                     |
| B    | 25                | 60.1                   | 2.75                | 93.2                     |
| C    | 30                | 41.4                   | 6                   | 96.3                     |
| D    | 30                | 11.7                   | 1.65                | —                        |

| Test | Electrolyte Volume (liters) | | A · Hrs/cm$^3$ Electrolyte | |
|------|------|------|------|------|
|      | Total | Top Reservoir | Sump | Total | Sump |

| | | | | | |
|---|---|---|---|---|---|
| | | | -continued | | |
| A | 2.41 | 1.0 | 1.41 | 0.53 | 0.9 |
| B | 2.41 | 1.0 | 1.41 | 0.56 | 0.96 |
| C | 2.25 | 0.57 | 1.68 | 0.49 | 0.65 |
| D | 2.25 | 0.57 | 1.68 | — | — |

With 1.65M KOH (Test D) the anode passivated after only 12 hours, causing the cell to fail. This was probably due to the pH falling below a critical level. As has previously been described, the pH of these electrolytes always falls as reaction (i) proceeds during early discharge. It can be concluded, therefore, that a minimum KOH molarity is necessary for the avoidance of anode passivation.

Similarly, 6M KOH (Test C) caused anode passivation after $\approx 40$ hours at the onset of hydrargillite precipitation. This occurred because the high molarity KOH allowed a very high aluminate supersaturation resulting in the electrolyte conductivity falling (and the viscosity rising) to a level which could not sustain further discharge. Hence, there is an upper limit to the molarity of KOH which can be employed in self-managing cells if they are to survive the first critical voltage trough. This upper limit can be extended by seeding.

Electrolytes of between $\approx 2.5M$ and 5.0M did not cause anode passivation in self-managing cells. The variation of electrolyte capacity (Amp.hours/cm$^3$ for KOH solutions in this molarity range is shown. Although the variation is not great, it can be seen from these values that the highest electrolyte capacities are generally obtained with molarities at the low end of this range.

EXAMPLE 6

A thin walled cell ($\approx 2.0$ mm gauge) was designed to operate with $O_2$ in a tightly fitting cell stack. Constructed out of two $\approx 50$ cm diameter fiberglass "shells", this cell had a series of recesses moulded into its outer surface which, when cells were bonded together in a stack, formed distribution channels allowing $O_2$ to be fed to the cathode chambers of each cell. The effective volume of this cell was $\approx 4.32$ liters. This design was developed out of experience obtained from the testing of cells of Examples 4 and 5. It was found that water loss (via transpiration through the cathodes) was less than in simple Al-air cells. This allowed the cathode windows to be positioned rather high, thereby increasing the relative volume of the lower reservoir and increasing the cells capacity to accommodate hydrargillite.

The cells outer circumference was wedge shaped in order to maximise the free surface area of each cell in a stack (for heat exchange purposes).

The anodes in this cell were a trapezoid shape of $\approx 600$ cm$^2$ surface area and were suspended from the lid by two rod current collectors. FIG. 10 is a front view, showing the anode, plus supports, and a series of separator/baffles which were used to maintain the cells mechanical integrity during assembly and testing, and to partially trap hydrargillite in the lower reservoir during protracted discharge periods.

Cells of this type were tested individually in order to develop reliable $O_2$ supply systems and to evaluate energy/power density capabilities.

This cell was discharged using a 2.75M KOH electrolyte containing 0.008M dissolved Sn. A constant cell load of 35 W (equals 50 mA/cm$^2$) was applied. The following results were obtained:

Mean voltage—1.45 V.
Mean current—24 A.
Discharge time—$\approx 87$ hours.
Effective cell volume—4.32 liters.
Total electrolyte volume—2.6 liters.
Electrolyte in the top reservoir—0.75 liters.
Electrolyte in the lower reservoir (sump)—1.85 liters.
Amp Hours per cm$^3$ of total electrolyte—0.8.
Amp Hours per cm$^3$ of electrolyte in the sump—1.13.
Cell energy density—$\approx 700$ Watt hours per liter.

EXAMPLE 7

A stack of 5 of the cells described in Example 6 was discharged for 40 hours at various power levels of 250 W, 50 W and 0 W (equivalent to 40 A, 6 A and 0 A). These power levels were imposed at irregular intervals. The temperature/time characteristics, as measured in the upper reservoir (the hottest region of any self managing cell) of the middle cell of the 5 cell stack was measured. During the high power (250 W) period of discharge, the electrolyte temperature never exceeded 71° C., even though the major material of construction of these demonstration cells was fibre glass which is a very poor thermal conductor. Should it have proved necessary, improved thermal management could have been achieved by standard techniques, e.g. construction using metal sheet in place of fibre glass, and/or heat exchange tubing in the upper reservoirs.

We claim:

1. An aluminium cell comprising a cathode and a facing aluminium anode defining between them a vertically extending electrolysis region and a housing to contain electrolyte of pH at least 12 comprising a sump which has an upper and a lower region, and is of sufficient size to contain enough aluminium hydroxide precipitate to permit the cell to continue operating after saturation of the electrolyte has taken place, the lower region of the sump providing a stagnant region where an aluminium hydroxide precipitate can settle by gravity, and having means for convective passage of electrolyte from the upper region of the sump to the electrolysis region and at least one channel for convective passage of electrolyte from the electrolysis region to the upper region of the sump.

2. A cell as claimed in claim 1, wherein the housing also comprises a top reservoir, and having means for convective passage of electrolyte from an upper region of the sump via the electrolysis region to the top reservoir and at least one channel for convective passage of electrolyte from the top reservoir to the upper region of the sump.

3. A cell as claimed in claim 1, wherein the volume of the sump is at least 4 times the volume of aluminium metal in the anode.

4. A cell as claimed in claim 1, wherein the anode is of an aluminium alloy containing manganese and/or magnesium and/or calcium with indium and/or tin present in the alloy and/or the electrolyte.

5. A cell as claimed in claim 4, wherein the anode is of an aluminium alloy containing 0.01–5% magnesium, with tin present in the alloy at a concentration of 0.005–0.2% and/or in the electrolyte at a concentration of 0.001 to 0.01M.

6. A cell as claimed in claim 1, wherein the anode is a sheet or plate and two air cathodes are provided one facing each major surface of the anode.

7. A cell as claimed in claim 1, wherein the anode is cylindrical or tubular, and an air cathode is provided surrounding and facing the cylindrical surface of the anode.

8. A method of operating a cell having a cathode, an aluminium anode and an alkaline electrolyte as recited in any one of claims 1 to 7, the method comprising drawing current from the cell at a rate and for a time such that convective circulation of electrolyte takes place between the top reservoir and/or the electrolysis region and the upper region of the sump, and an aluminium hydroxide precipitate settles by gravity in a stagnant lower region of the sump.

9. A method as claimed in claim 8, wherein current is drawn from the cell at a rate of 5–75 mA per cm$^2$ of anode surface.

10. A battery having at least one stack of cells, each cell as recited in any one of claims 1 to 7.

11. A battery as claimed in claim 10, wherein said at least one stack comprises two stacks of metal/oxygen cells, and wherein each cell has an electrically non-conducting housing comprising opposed faces and a rim region, wherein the rim region is generally D-shaped including a vertically extending generally straight portion, with each stack being formed by abutting faces of adjacent housings together, and the pair of stacks being formed by abutting together the vertically extending generally straight portions of the rims of the cells of the two stacks.

12. A battery as claimed in claim 10 comprising a plurality of metal/oxygen cells, or stacks of cells, arranged electrically in series with an electrical circuit for drawing current from the battery, wherein there are provided means for switching one or more cells or stacks of cells out of the circuit.

13. A battery as claimed in claim 10, comprising an even number of the stacks of metal/oxygen cells and an oxygen supply, wherein the stacks of cells are arranged in one or more pairs symmetrically on opposite sides of the oxygen supply, and means are provided for passing oxygen from the supply to the or each pair of stacks of cells.

14. A battery as claimed in claim 10, wherein there is provided an evaporating heat exchanger having a hot section within the housing to be in contact with the electrolyte and communicating with a cold section outside the housing.

* * * * *